United States Patent
Voller et al.

(10) Patent No.: US 9,774,201 B2
(45) Date of Patent: Sep. 26, 2017

(54) BATTERY CHARGER

(71) Applicant: ZAPGOCHARGER LTD., Oxfordshire (GB)

(72) Inventors: Stephen Voller, Hampshire (GB);
Jonathan R. Tuck, Oxfordshire (GB);
Marappa Rajendran, Coventry (GB);
Ana Trindade, Oxfordshire (GB);
Madhuri Dutta, Oxford (GB); Nazanin Rashidi, Oxford (GB); Tim Walder, Winchester (GB); Quentin Lemarié, Oxfordshire (GB)

(73) Assignee: ZapGo Ltd, Oxford (GB)

( * ) Notice: Subject to any disclaimer, the term of this patent is extended or adjusted under 35 U.S.C. 154(b) by 86 days.

(21) Appl. No.: 14/936,871

(22) Filed: Nov. 10, 2015

(65) Prior Publication Data
US 2016/0141900 A1 May 19, 2016

(30) Foreign Application Priority Data

Nov. 13, 2014 (GB) .................................. 1420162.8
Jul. 31, 2015 (GB) .................................. 1513595.7

(51) Int. Cl.
*H02J 7/00* (2006.01)
*H01G 11/04* (2013.01)
(Continued)

(52) U.S. Cl.
CPC ............ *H02J 7/0044* (2013.01); *H01G 11/04* (2013.01); *H02J 7/0052* (2013.01); *H02J 7/0054* (2013.01);
(Continued)

(58) Field of Classification Search
CPC ....... H02J 7/0044; H02J 7/0052; H01G 11/04
(Continued)

(56) References Cited

U.S. PATENT DOCUMENTS 5,572,108 A * 11/1996 Windes .................. H02M 1/32
                                                    320/167
5,827,602 A    10/1998 Koch et al.
(Continued)

FOREIGN PATENT DOCUMENTS

CN        104064364        9/2014
CN        104229780        12/2014
(Continued)

OTHER PUBLICATIONS

Qui et al., "High Performance Supercapacitors based on High Conductive Nitrogen-doped Graphene Sheets", 2011, Physical Chemistry Chemical Physics (PCCS) Journal, Paper, vol. 13, pp. 12552-12558.*

(Continued)

*Primary Examiner* — Sun Lin
(74) *Attorney, Agent, or Firm* — HodgsonRuss LLP

(57) ABSTRACT

A rechargeable battery charger is provided and is characterized by comprising a supercapacitor comprised of one or more sheets of graphene or a graphene-containing material, a power module adapted to provide a current up to 40 amps to the supercapacitor from a source of alternating current rated at 100 volts or above, an output converter adapted to deliver direct current power from the supercapacitor to an output port for connecting to a battery-powered electrical device, and a control module adapted to control various functions of the rechargeable battery charger automatically and/or for managing and regulating a variable output from the supercapacitor. The rechargeable battery charger is especially useful for recharging portable electrical devices such as smartphones, tablets, laptops or similar hand-held or worn items.

16 Claims, 2 Drawing Sheets

(51) Int. Cl.
*H02J 7/34* (2006.01)
*H01G 11/08* (2013.01)
*H01G 11/36* (2013.01)

(52) U.S. Cl.
CPC .............. *H02J 7/345* (2013.01); *H01G 11/08* (2013.01); *H01G 11/36* (2013.01)

(58) Field of Classification Search
USPC ........................................................ 320/114
See application file for complete search history.

(56) References Cited

U.S. PATENT DOCUMENTS

| | | | |
|---|---|---|---|
| 6,265,851 B1 * | 7/2001 | Brien et al. ........... | B60L 11/005 320/137 |
| 7,042,197 B2 * | 5/2006 | Turner et al. ............. | G06F 1/26 320/136 |
| 8,315,039 B2 * | 11/2012 | Zhamu et al. ......... | B82Y 30/00 361/502 |
| 8,482,263 B2 * | 7/2013 | Barrade et al. ....... | H02J 7/0054 320/103 |
| 8,503,161 B1 | 8/2013 | Chang et al. | |
| 8,890,476 B2 * | 11/2014 | Martienssen et al. . | H01G 9/038 307/109 |
| 8,894,886 B1 * | 11/2014 | Luhrs et al. ........ | C01B 31/0469 252/378 R |
| 9,065,354 B2 * | 6/2015 | Chapman et al. ...... | H02J 3/383 |
| 9,437,372 B1 * | 9/2016 | Zhamu et al. .......... | C04B 35/52 |
| 9,438,113 B2 * | 9/2016 | Wyatt et al. ........ | H01M 10/625 |
| 2004/0004462 A1 | 1/2004 | Bean et al. | |
| 2004/0036449 A1 * | 2/2004 | Bean et al. ............. | H02J 7/345 320/166 |
| 2004/0155631 A1 | 8/2004 | Ishizu | |
| 2005/0083020 A1 | 4/2005 | Baarman | |
| 2010/0026248 A1 * | 2/2010 | Barrade et al. ....... | H02J 7/0054 320/166 |
| 2012/0045688 A1 | 2/2012 | Liu et al. | |
| 2012/0170171 A1 | 7/2012 | Lee et al. | |
| 2013/0271092 A1 | 10/2013 | Borkar | |
| 2014/0127584 A1 | 5/2014 | Kim et al. | |
| 2014/0321027 A1 | 10/2014 | Nguyen et al. | |
| 2016/0284481 A1 * | 9/2016 | Duan et al. ............ | H01G 11/36 |

FOREIGN PATENT DOCUMENTS

| | | |
|---|---|---|
| KR | 20140094346 | 7/2014 |
| WO | 2006112698 | 10/2006 |
| WO | 2013180661 | 12/2013 |

OTHER PUBLICATIONS

Zap&Go portable charger fuels up in just 5 minutes, GizMag, http://www.gizmag.com/zap-and-go-supercapacitor-charger/34228/, Retrieved from the Internet on Dec. 11, 2015 Oct. 14, 2014.
Mertens, Ron, Graphene supercapacitor charger initiative by Zapgocharger, Graphene Info, http://www.graphene-info.com/graphene-supercapacitor-charger-initiative-zapgocharger, Retrieved from the Internet on Dec. 11, 2015 Nov. 10, 2014.
Zap&Go first graphene supercapacitor charger, INDIEGOGO, https://www.indiegogo.com/projects/zap-go-first-graphene-supercapacitor-charger#/, Accessed Jul. 20, 2016, See all posts and updates prior to Nov. 13, 2014 Nov. 13, 2014.
Zapgocharger Ltd., Facebook page, https://www.facebook.com/zapandgo, Accessed May 27, 2015, See all comments preceding Nov. 13, 2014 Nov. 13, 2014.

* cited by examiner

BATTERY CHARGER

CROSS-REFERENCE TO RELATED APPLICATIONS

This application claims priority to United Kingdom Application No. 1420162.8, filed Nov. 13, 2014, and to United Kingdom Application No. 1513595.7, filed Jul. 31, 2015, the disclosures of each of which are incorporated herein by reference.

FIELD OF THE DISCLOSURE

This invention relates to a rechargeable battery charger for use with portable electronic devices such as mobile phones, tablets, laptops and the like.

BACKGROUND OF THE DISCLOSURE

Portable electronic devices are today ubiquitous throughout society as illustrated by the fact that, in many developed countries, it is estimated that over 90% of their population over the age of sixteen uses a mobile phone. Whilst technical developments in the rechargeable batteries used to power such devices have meant that over the years such devices have become usable for longer and longer periods, a number of issues still remain. These include (1) the need to recharge the device more frequently as the battery ages and (2) the power demands placed by the operation of modern software which inevitably drains batteries faster. As a consequence, most users today are finding it necessary to recharge their devices more frequently than in the past.

This has in turn led to a technical problem because the current lithium ion batteries used today are slow to recharge when plugged into a conventional electricity ring main, typically taking a period of many hours. This is particularly inconvenient for the traveller as evident by the large number of people often wanting to use wall plugs in airports, cafes, conference centres and the like. It would therefore be useful for the traveller to have a reliable portable battery charger, which could both recharge such batteries safely, and itself be quickly rechargeable. Whilst there are a number of such devices on the market they tend to be very bulky and/or still slow to recharge themselves.

One approach to achieving a faster recharge is to use a charger incorporating a supercapacitor as they are able to both hold significant charge and to charge and discharge quickly. However their stored charge density remains small and it has been estimated that a conventional supercapacitor made from double-wound aluminium foil sheets would need to be the size of a small beverage can and weigh around half a kilogram to charge the average smartphone. This makes it impractical to carry and connect to the device.

It is therefore one object of the present invention to provide a battery charger which can rapidly recharge itself, and subsequently a portable electronic device, and another to provide a device that is light enough and small enough to render it portable.

BRIEF SUMMARY OF THE DISCLOSURE

We have previously drawn attention on Facebook to our intention to market a graphene supercapacitor battery charger rated at 1500 mAh that is equipped with a generic USB port that will charge any type of mobile phone or tablet. However in this generic disclosure there is no teaching of the design claimed below and in particular the nature of the control module that will be used.

The use of graphene in the construction of capacitors has been disclosed in WO2013180661, CN104229780, US2012170171, KR20140094346, CN104064364, US2014127584, US2012045688 and U.S. Pat. No. 8,503,161.

US20140321027 discloses a rechargeable power source for mobile devices which includes an ultracapacitor having carbon nanotubes attached to a less than 100 nm thick metal oxide layer disposed on a metal foil.

Thus, according to the present invention there is provided a rechargeable battery charger characterised by comprising;
 a supercapacitor comprised of one or more sheets of graphene or a graphene-containing material;
 a power module adapted to provide up to 40 amps to the supercapacitor from a source of alternating current rated at 100 volts or above;
 an output converter adapted to deliver direct current power from the supercapacitor to an output port for connecting to a battery-powered electrical device and
 a control module adapted to control the charger's various functions automatically and/or for managing and regulating a variable output from the supercapacitor.

Preferably, the control module includes, for example, a microprocessor and/or switching device, for controlling some or all of its various functions automatically, and for managing and regulating a variable output from the supercapacitor.

The supercapacitor itself should suitably be one capable of storing at least 1000 F (Farads) of capacitance, and preferably 2000 F, or most preferably 3000 F or greater, and delivering an output, either singularly or in combination, of at least 1000 mAh for at least 15 minutes for example from 15 to 60 minutes; or alternatively 60 minutes or longer. It should also be able to operate at a voltage of at least 2.5v, for example in the range 2.7 to 7v, 3 to 7v or alternatively even above 7v. It should be capable of charging the electrical device to which the battery charger is connected to at least 20% of its capacity, for example from 20% to 50% or alternatively 50% to 100%. The charge time will depend on the maximum rate of charge allowed by the lithium batteries and/or the capacity of the input port of the device. However the battery charger should be capable of charging the device to 20% in 5 to 30 minutes.

The supercapacitor employed herein is suitably made from one or more sheets of graphene or a graphene-containing material; materials which are not only lightweight and highly electrically conductive but also able to store electrical charge at high densities. In one embodiment, the graphene-containing material comprises composite sheets of graphene and/or reduced graphene oxide particles typically less than 1 micron, preferably less than 100 nanometres, in size suspended in an electrically-conducting matrix. In such an embodiment, it is preferred that these nanoparticles exhibit mesoporosity with mesopores in the size range 2 to 50 nanometres. In another embodiment, the graphene-containing material may be additionally contain carbon nanotubes, activated carbon, buckminsterfullerenes and/or be additionally doped with nanoparticles of materials which can confer a degree of pseudocapacitance behaviour on the final supercapacitor; for example salts, hydroxides and oxides of metals such as lithium or transition metals with more than one oxidation state including nickel, manganese, ruthenium, bismuth, tungsten or molybdenum. In yet another embodiment, the sheets of graphene or graphene-containing material are made manifest as a thin graphene-containing layer mounted on or printed onto a thin sheet of an electrically-conducting metal such as copper, nickel or aluminium.

In one preferred embodiment, the supercapacitor is of the double-layer type and comprised of at least two electrodes each comprising aluminium foil coated with a graphene or graphene-containing material as described above separated by a polymer membrane which is impregnated with an ionic liquid having a melting point below 100° C. In one preferred embodiment this ionic liquid is selected from a low-melting salt of an alkyl or substituted-alkyl pyridinium, pyridazinium, pyrimidinium, pyrazinium, imidazolium, piperidinium, pyrrolidinium, pyrazolium, thiazolium, oxazolium or triazolium cation. In such a case it is preferred that the counter anion is large, polyatomic, and has a Van der Waals volume in excess of 50 or 100 angstroms (see for example U.S. Pat. No. 5,827,602 which provides illustrative examples which are incorporated by reference and are contemplated as being within the scope of our invention). In one embodiment, this counter-anion is selected for example from hexafluorophosphate, dicyanamide,bis (fluorosulphonyl)imide (FSI), bis(trifluoromethylsulphonyl)imide(TFSI) or bis(perfluoro $C_2$ to $C_4$ alkylsulphonyl)imide e.g. bis(perfluoroethylsulphonyl)imide anions. In another preferred embodiment, the ionic liquid is selected from $C_1$ to $C_4$ alkyl substituted imidazolium, piperidinium or pyrrolidinium salts of these anions with any permutation of the cations and anions mentioned above being specifically envisaged as disclosed herein. Specific, non-limiting examples based on these salts include 1-ethyl-3-methyl-imidazolium (EMIM) bis(fluorosulphonyl)imide, 1-ethyl-3-methyl-imidazolium bis(trifluoromethylsulphonyl)imide; 1-ethyl-3-methyl-imidazolium bis(perfluoroethylsulphonyl)imide; 1-methyl-1-propylpyrrolidinium bis(fluorosulphonyl)imide; 1-methyl-1-butylpyrrolidinium bis(fluorosulphonyl)imide; 1-methyl-1-propylpyrrolidinium bis(trifluoromethylsulphonyl)imide; 1-methyl-1-butylpyrrolidinium bis(trifluoromethylsulphonyl)imide; 1-ethyl-3-methyl-imidazolium hexafluorophosphate: 1-ethyl-3-methyl-imidazolium dicyanamide; 1-methyl-l-propylpyrrolidinium hexafluorophosphate: 1-methyl-1-propylpyrrolidinium dicyanamide; 1-methyl-1-butylpyrrolidinium hexafluorophosphate or 1-methyl-1-propylpyrrolidinium dicyanamide.

In one embodiment, the supercapacitor mentioned above is manufactured as a flat sheet-like composite which is flexible enough to be coiled-up thereby saving space. In this embodiment the interstices between the coils are then typically filled with an insulator. In another embodiment, the supercapacitor is contained within a sealed pouch from which only electrical connectors protrude.

The power source is suitably adapted to receive AC power from a source rated at 110v, 220v, 230v, 240v or other domestic standard; such as a domestic or commercial ring main. This unit may additionally include a transformer to enable the supercapacitor to be charged at the optimum voltage. In another embodiment, at least one of the components in this unit may also include graphene or a graphene-containing material.

The output converter is suitably adapted to deliver direct current power to one or more standard output ports and thence by means of a connector such as a conventional lead to an input on the electrical device to be charged; for example by means of a conventional USB port or similar connector rated at 5v. In another embodiment at least one of the components of the output converter may also include graphene or a graphene-containing material.

Turning to the control module, this may be controlled by a switch or microprocessor. In one embodiment the control module includes at least one charging-circuit adapted so that when the battery charger is plugged in, it detects the degree to which the supercapacitor is already charged and thereafter only supplies charge to bring it back to 100% charge. In one preferred embodiment, this occurs by means of the control module receiving a feedback voltage or current from the supercapacitor. In another embodiment, the control module is connected to an audible alarm or light indicator; for example on the exterior casing of the battery charger, to notify the user when charging of the supercapacitor is complete. In yet another embodiment, the control module includes additional circuitry so that, whilst the battery charger is being charged or when charging is complete, the relevant device can still be powered by the supercapacitor.

The control module will further and optionally include a series of diodes or comprise one-way circuits to prevent leakage or an unsafe electrical discharge of the supercapacitor back through the charging circuit(s). In one embodiment, it will include a means to isolate the supercapacitor when fully charged or unplugged. The control module may also include both voltage and heat sensors to ensure these fail-safe features are activated automatically. Finally, in one embodiment the charger may include a means to discharge the supercapacitor quickly other than through the device being charged (for example though a resistor or an equivalent circuitry) if it becomes necessary to do so in an emergency or the user is asked to do so because of travel restrictions.

In another aspect of the invention, the battery charger is made manifest as a lightweight, portable stand-alone item disposed within a casing which is not only mechanically robust, shock-resistant and earthed, but also connectable to the electrical device to be charged using a releasable connector such as a lead or hard connection. The casing itself can be made of any good insulating material such as plastic, fibre-reinforced composite, Kevlar, ceramic fibres, glass fibres glass. It can also be made of metal such as aluminium, steel and the like if properly insulated. In yet another, the battery charger is itself modular and can be or is fitted into and removed from a corresponding void in the housing of the portable electrical device with which it is to be used or onto an external surface thereof In such embodiments, some or all of the functions of the control module may be made integral or shared with those of the electrical device itself In yet another embodiment, the battery charger is non-portable and rather permanently mounted at a fixed location in a building, e.g. a wall, adjacent to the source of the AC power. In one version of this embodiment, the invention the battery charger is made manifest as an array of two or more such battery charger elements commonly located and sharing the same AC power source and/or the same supercapacitor(s). In such an embodiment, there may be then associated with each element in the array a means for identifying which are in a usable state or which a user of the array should choose. In another embodiment, the array may be linked to a system so that activation of the relevant element is contingent on the payment of a fee. Such arrays are particularly suitable for location in communal spaces where people may be expected to spend significant time such as airports, railway stations, conference centres, hotels, restaurants, cafes, shopping centres and the like.

In one embodiment of the battery charger's stand-alone form, the power source and the output converter are suitably permanently located in a casing which also includes a void into which the supercapacitor(s) can be inserted or removed.

This enables the supercapacitor(s) to be easily changed in the event of failure or leakage.

Suitably the battery charger is designed and manufactured so that it conforms to EU directive EC 2002/96 on the disposal of waste electrical components or equivalent national or federal legislation in other jurisdictions around the world. Suitably the battery charger also corresponds to relevant national and federal product safety legislation; for example in Europe to EC 2001/95.

The battery charger of the present invention may further comprise other materials and components used in the art for example thermal insulators and heat sinks for heat management; ancillary electrical insulation; switches; and lights, dials, meters and the like for monitoring the progress of charging (both of the charger and the electrical device if required).

The battery charger of the present invention may be used to recharge any battery-powered electrical device including cordless electrically-powered tools (e.g. drills, screwdrivers, sanders and the like) and cordless domestic appliances (vacuum cleaners etc.); especially those devices which are portable or capable of being easily transported. In one especially useful embodiment, the battery charger of the present invention is designed for recharging personal electrical devices such as smartphones, radios, CD and DVD players, tablets, laptops or similar hand-held or worn items.

BRIEF DESCRIPTION OF THE FIGURES

For a fuller understanding of the nature and objects of the invention, reference should be made to the following detailed description taken in conjunction with the accompanying drawings, in which.

DETAILED DESCRIPTION OF THE DISCLOSURE

The battery charger of the present invention is now illustrated with reference to FIGS. 1 and 2 which should not be construed as limiting the scope of the invention.

Figure 1:
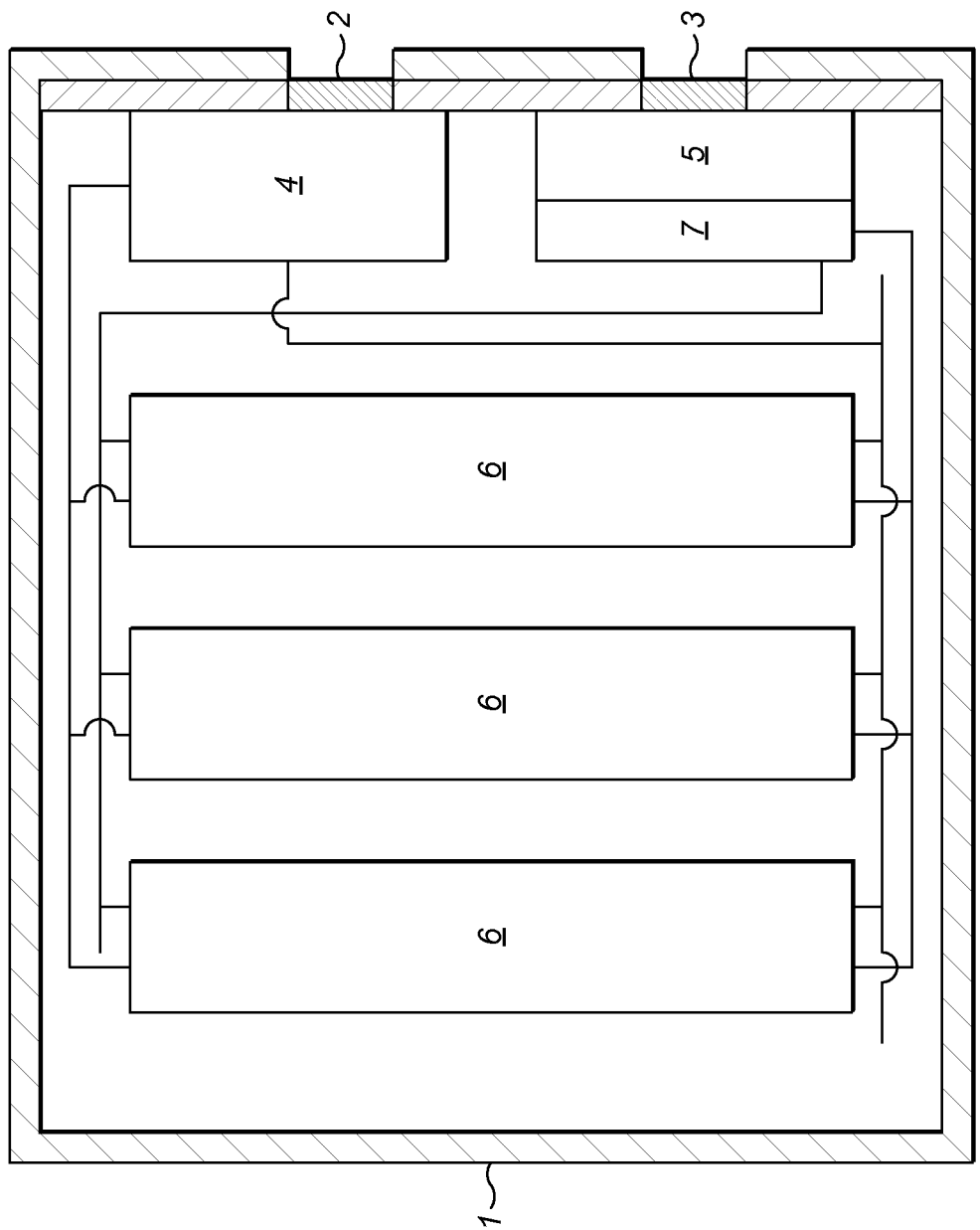
FIG. 1 is a battery charger according to the present invention.

A battery charger according to the present invention is shown in the attached FIG. 1. It comprises a casing 1 containing a power source 4 containing a transformer (not shown) and an output converter 5 attached by charging and discharging circuits to three supercapacitors 6. The supercapacitors each consist of a sealed polymer pouch containing either graphene-coated aluminium foil electrodes with a polymer membrane sandwiched between and which is impregnated with the ionic liquid EMIM TFSI or alternatively two coil-wound sheets of a composite comprising a sheet of graphene sandwiched between two polymer sheets. 2 and 3 comprise 30 pin cable sockets such as those found on an iPhone® or similar device. Integral with 5 is control module 7 for regulating current produced from 6 to socket 3 and flowing through the discharge circuit.

Figure 2:
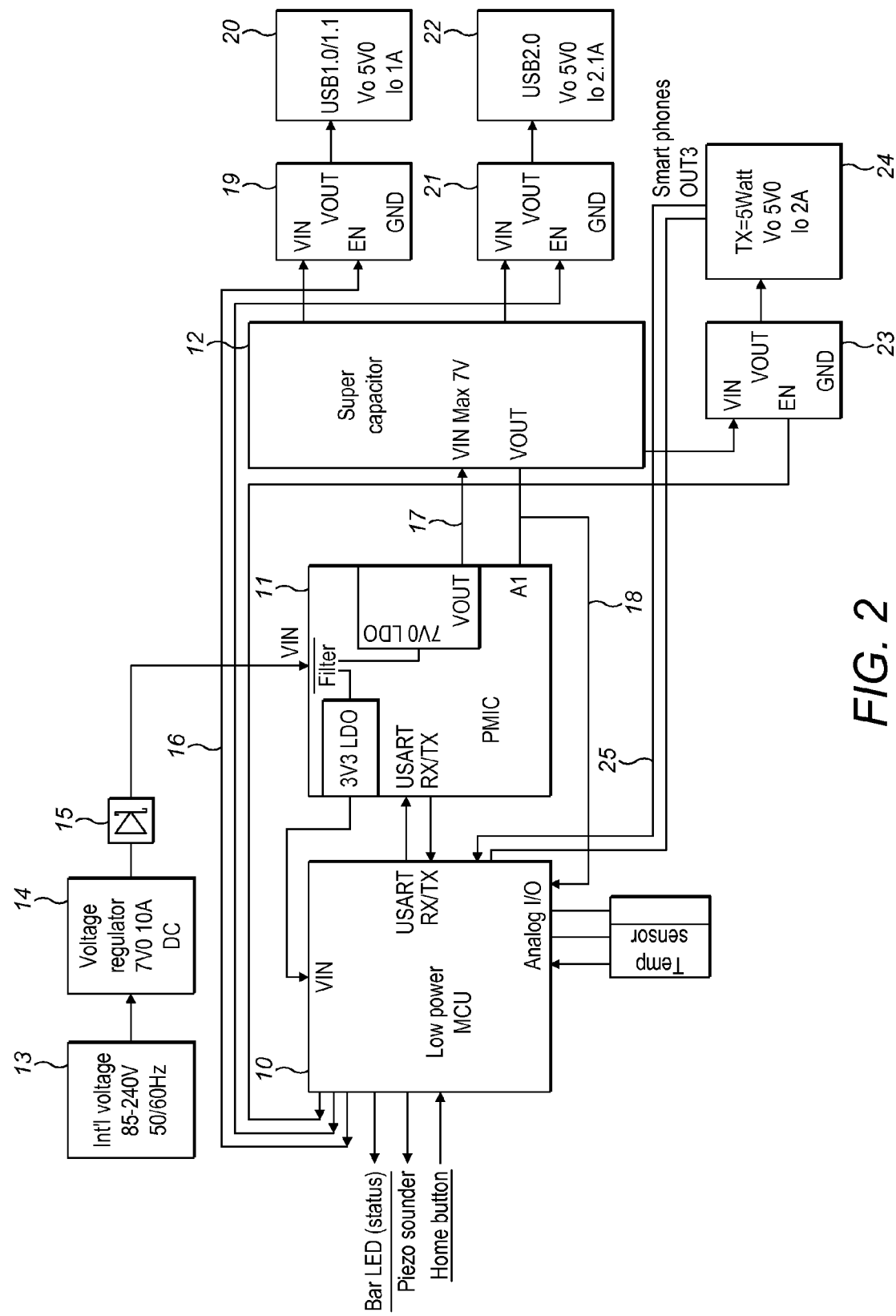
FIG. 2 is a block circuit diagram for a battery charger according to the present invention.

FIG. 2 also shows a block circuit diagram for a battery charger according to the present invention. It includes a supercapacitor of the type described above, a power management integrated circuit (PMIC) for managing power requirements to the host system, a low-power microcontroller, a voltage regulator to provide power from an AC main and DC to DC output convertors. The following are shown in FIG. 2:

Low power MCU (10);
PMIC (11);
Supercapacitor (12);
AC/DC mains (13);
LDO (14);
No return (15);
Output control switch (16);
Output power (17);
Communication & control (18);
DC-DC converter (19);
Legacy phone devices OUT1 (20);
DC-DC converter (21);
Tablet/smart phones OUT2 (22);
DC-DC converter (23);
QI charging dock power transmitter (24); and
Sensing and control (25).

The invention claimed is:

1. A rechargeable battery charger comprising:
a supercapacitor comprised of one or more sheets of graphene or a graphene-containing material;
a power module adapted to provide a current up to 40 amps to the supercapacitor from a source of alternating current rated at 100 volts or above;
an output converter adapted to deliver direct current power from the supercapacitor to an output port for connecting to a battery-powered electrical device; and
a control module adapted to control various functions of the rechargeable battery charger automatically and/or for managing and regulating a variable output from the supercapacitor, wherein the control module includes at least one charging circuit adapted to detect a degree to which the supercapacitor is already charged and thereafter bring it back to 100% charge, and wherein the control module further receives a feedback voltage or a current from the supercapacitor.

2. The rechargeable battery charger as claimed in claim 1, wherein the control module includes means to prevent a leakage or an unsafe electrical discharge of the supercapacitor back through the at least one charging circuit.

3. The rechargeable battery charger as claimed in claim 1, wherein the battery charger includes a voltage sensor and a heat sensor connected to or integral with the control module.

4. The rechargeable battery charger as claimed in claim 1, wherein the rechargeable battery charger includes a user-operated means to discharge the supercapacitor other than through the battery-powered electrical device being charged.

5. The rechargeable battery charger as claimed in claim 1, wherein the supercapacitor is capable of delivering an output of up to 1000 mAh for at least 15 minutes.

6. The rechargeable battery charger as claimed in claim 1, wherein the supercapacitor includes at least two electrodes each comprising a layer of graphene-containing material on a sheet of conducting metal and a polymer membrane sandwiched therebetween which is impregnated with an ionic liquid having a melting point below 100° C.

7. The rechargeable battery charger as claimed in claim 6, wherein the ionic liquid is selected from low-melting salts of alkyl or substituted-alkyl pyridinium, pyridazinium, pyrimidinium, pyrazinium, imidazolium, piperidinium, pyrrolidinium, pyrazolium, thiazolium, oxazolium or triazolium cation.

8. The rechargeable battery charger as claimed in claim 7, wherein the imidazolium, piperidinium or pyrrolidinium cation is selected from $C_1$ to $C_4$ alkyl substituted imidazolium, piperidinium or pyrrolidinium cations.

9. The rechargeable battery charger as claimed in claim 7, wherein a counter-anion to the cation is selected from hexafluorophosphate, dicyanamide, bis(fluorosulphonyl)imide, bis(trifluoromethylsulphonyl)imide or a bis(perfluoro$C_2$ to $C_4$ alkylsulphonyl)imide.

10. The rechargeable battery charger as claimed in claim 1, wherein the rechargeable battery charger is capable of charging an electrical device to which it is attached to at least 20% charge capacity in 5 to 30 minutes.

11. The rechargeable battery charger as claimed in claim 1, wherein the power module and the output converter are permanently located in a casing which also includes a housing into which the supercapacitor is inserted or removed.

12. The rechargeable battery charger as claimed in claim 1, wherein the power module is adapted to receive AC power from a domestic or commercial ring main.

13. The rechargeable battery charger as claimed in claim 1, wherein the rechargeable battery charger is able to operate at a voltage in a range from 2.7 volts to 7 volts.

14. A rechargeable battery charger array comprising a plurality of rechargeable battery chargers as claimed in claim 1.

15. A portable electronic device including a void adapted to receive and connect to a rechargeable battery charger as defined in claim 1.

16. The portable electronic device as claimed in claim 15, wherein the control module of the rechargeable battery charger is integral with that of the portable electronic device.

\* \* \* \* \*